(12) United States Patent
Eichenhofer et al.

(10) Patent No.: US 10,384,387 B2
(45) Date of Patent: Aug. 20, 2019

(54) METHOD FOR PRODUCING A FRAMEWORK

(71) Applicant: 9T Labs AG, Zürich (CH)

(72) Inventors: Martin Eichenhofer, Deggenhausertal (DE); Florian Eichenhofer, Deggenhausertal (DE)

(73) Assignee: 9T Labs AG, Zürich (CH)

( * ) Notice: Subject to any disclaimer, the term of this patent is extended or adjusted under 35 U.S.C. 154(b) by 186 days.

(21) Appl. No.: 15/307,958

(22) PCT Filed: Apr. 7, 2015

(86) PCT No.: PCT/EP2015/000736
§ 371 (c)(1),
(2) Date: Oct. 31, 2016

(87) PCT Pub. No.: WO2015/169414
PCT Pub. Date: Nov. 12, 2015

(65) Prior Publication Data
US 2017/0057149 A1  Mar. 2, 2017

(30) Foreign Application Priority Data

May 9, 2014 (DE) ........................ 10 2014 006 706

(51) Int. Cl.
*B29C 47/00* (2006.01)
*B29C 48/00* (2019.01)
(Continued)

(52) U.S. Cl.
CPC ........ *B29C 48/0021* (2019.02); *B29C 48/022* (2019.02); *B29C 48/04* (2019.02);
(Continued)

(58) Field of Classification Search
CPC .......................... B29C 66/7212; B29C 69/00; B29C 47/0011; B29C 47/0014; B29C 47/0038;
(Continued)

(56) References Cited

U.S. PATENT DOCUMENTS

| 5,644,888 | A | * | 7/1997 | Johnson | ................ | B29C 70/525 |
| | | | | | | 52/651.01 |
| 2002/0170941 | A1 | * | 11/2002 | Wallach | ................ | B21F 27/128 |
| | | | | | | 228/170 |

(Continued)

FOREIGN PATENT DOCUMENTS

| DE | 10 2006 008 728 B3 | 7/2007 |
| EP | 2 676 784 A1 | 12/2013 |

(Continued)

OTHER PUBLICATIONS

International Search Report of PCT/EP2015/000736, dated Aug. 6, 2015.

*Primary Examiner* — Vishal I Patel
(74) *Attorney, Agent, or Firm* — Collard & Roe, P.C.

(57) ABSTRACT

With a method for producing a two-dimensional or three-dimensional framework (1) with rods (2) of a composite material with fibers and a matrix, which are connected with nodes (3) to at least one other rod (2) and/or another component (29), comprising the steps of: producing the rods (2) out of a composite material, connecting the rods (2) with at least one other rod (2) and/or another component (29) at the nodes (3), the framework (1) should be manufactured inexpensively and reliably by a low technical effort.

Figure 1:
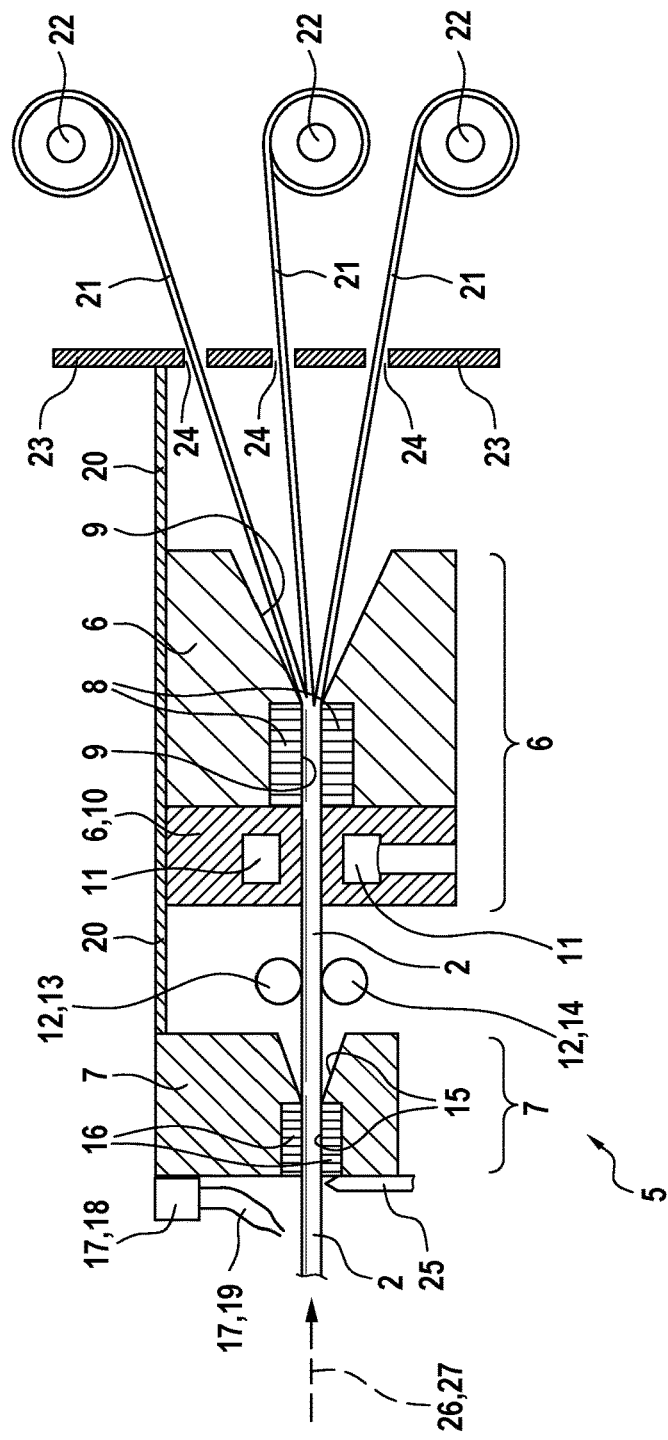

This object can be solved in a way that the rods (2) are being produced with pultrusion and/or extrusion and a pultrusion unit (6) and/or an extrusion unit (7) is moved in space such that after the pultrusion and/or extrusion the pultruded (Continued)

and/or extruded rods (2) are pultruded and/or extruded in each case at the required position within the framework (1).

20 Claims, 5 Drawing Sheets

(51) Int. Cl.
| | |
|---|---|
| B29C 48/06 | (2019.01) |
| B29C 70/52 | (2006.01) |
| B29C 69/00 | (2006.01) |
| B29C 65/56 | (2006.01) |
| B29C 65/64 | (2006.01) |
| B29C 65/00 | (2006.01) |
| B29C 65/02 | (2006.01) |
| B29C 70/84 | (2006.01) |
| B29C 48/05 | (2019.01) |
| B29C 48/04 | (2019.01) |
| B29C 48/91 | (2019.01) |
| B29K 105/06 | (2006.01) |
| B29L 12/00 | (2006.01) |
| B29C 48/30 | (2019.01) |
| B29C 48/86 | (2019.01) |
| B29C 48/02 | (2019.01) |
| B29C 48/154 | (2019.01) |
| B29C 48/285 | (2019.01) |
| B29C 48/87 | (2019.01) |
| B29C 48/88 | (2019.01) |

(52) U.S. Cl.
CPC .............. *B29C 48/05* (2019.02); *B29C 48/06* (2019.02); *B29C 48/91* (2019.02); *B29C 65/028* (2013.01); *B29C 65/565* (2013.01); *B29C 65/64* (2013.01); *B29C 66/1242* (2013.01); *B29C 66/30325* (2013.01); *B29C 66/532* (2013.01); *B29C 66/54* (2013.01); *B29C 66/61* (2013.01); *B29C 66/72141* (2013.01); *B29C 66/73921* (2013.01); *B29C 66/742* (2013.01); *B29C 69/00* (2013.01); *B29C 70/52* (2013.01); *B29C 70/845* (2013.01); *B29C 48/001* (2019.02); *B29C 48/0013* (2019.02); *B29C 48/0022* (2019.02); *B29C 48/02* (2019.02); *B29C 48/154* (2019.02); *B29C 48/2883* (2019.02); *B29C 48/30* (2019.02); *B29C 48/865* (2019.02); *B29C 48/87* (2019.02); *B29C 48/911* (2019.02); *B29C 66/12421* (2013.01); *B29C 66/12423* (2013.01); *B29C 66/12425* (2013.01); *B29C 66/7212* (2013.01); *B29C 66/7392* (2013.01); *B29C 66/7394* (2013.01); *B29C 2793/0027* (2013.01); *B29K 2105/06* (2013.01); *B29L 2012/00* (2013.01)

(58) Field of Classification Search
CPC .............. B29C 47/0066; B29C 47/025; B29C 47/1036; B29C 47/12; B29C 47/862; B29C 47/864; B29C 47/8815; B29C 47/0045; B29C 2793/0027; B29C 70/52; B29C 65/565; B29C 65/64; B29K 2309/08; B29K 2307/04; B29K 2277/10
See application file for complete search history.

(56) References Cited

U.S. PATENT DOCUMENTS

| | | |
|---|---|---|
| 2013/0149521 A1* | 6/2013 | Nelson .................. B29C 70/081 428/221 |
| 2013/0337256 A1 | 12/2013 | Farmer et al. |
| 2014/0061974 A1 | 3/2014 | Tyler |
| 2014/0367021 A1* | 12/2014 | Schleiermacher .... B29C 70/521 156/73.2 |

FOREIGN PATENT DOCUMENTS

| | | | | |
|---|---|---|---|---|
| EP | 2676784 A1 | * | 12/2013 | ......... B29C 47/0002 |
| WO | WO-2013092738 A2 | * | 6/2013 | ........... B29C 70/521 |

* cited by examiner

METHOD FOR PRODUCING A FRAMEWORK

CROSS REFERENCE TO RELATED APPLICATIONS

This application is the National Stage of PCT/EP2015/000736 filed on Apr 7, 2015, which claims priority under 35 U.S.C. § 119 of German Application No. 10 2014 006 706.8 filed on May 9, 2014, the disclosures of which are incorporated by reference. The international application under PCT article 21 (2) was not published in English.

The present invention relates to a method for producing a two-dimensional or three-dimensional framework.

Frameworks as constructions are used in various technical areas, for example in mechanical engineering and in construction engineering. Especially in mechanical engineering, for example in aircraft or vehicle construction, lightweight constructions are desirable to thereby obtain a construction with a low weight or a low mass. Lightweight constructions can be produced in particular by means of a framework. The framework consists of a plurality of rods, which are connected to one another at the end regions or the ends with nodes. As a result, two-dimensional or three-dimensional structures or constructions can be produced on the one hand with a correspondingly large spatial extent which nevertheless have because of the use of rods a low mass respectively a low weight in relation to the limited installation space and achieve a high stiffness and bending strength.

From DE 10 2006 008 728 B3 a method for the production of a three-dimensional framework is known, comprising the following steps: producing a two-dimensional lattice structure consisting of rod-shaped linear semifinished products in which the semifinished articles cross over at defined crosspoints, connecting the rod-shaped linear semifinished products at the crossing points, softening of the rod-shaped linear semifinished products by local application of temperature to the lattice structure along three non-intersecting straight lines, introducing a force into the lattice structure along the middle of the temperature-loaded straight lines, whereby the introduced force being deflected by force pairs of tensile forces acting in the semifinished products due to a deformation of the lattice structure, with the consequence that the lattice structure is drawn along the average temperature-loaded straight line into a third dimension. The rod-shaped linear semifinished products consist of thermoplastics or duromers and can additionally be provided with amination fibers. However, due to the manufacturing method, the production of the three-dimensional framework is laborious and thus expensive.

A method for producing a three-dimensional object made of a composite material is known from US 2014/0061974 A1. Two or more materials are simultaneously extruded as a composite material.

The object of the present invention is therefore to provide a method and a framework in which the framework can be manufactured inexpensively and reliably by a low technical effort.

This object is achieved by a method for producing a two-dimensional or three-dimensional framework or/respectively truss with rods or/respectively members as rods of a composite material with fibers and a matrix, which are connected with nodes to at least one other rod and/or another component, comprising the steps of: producing the rods out of a composite material, connecting the rods with at least one other rod and/or another component at the nodes, whereby the rods are being produced with pultrusion and/or extrusion and a pultrusion unit and/or an extrusion unit is moved in space such that after the pultrusion and/or extrusion the pultruded and/or extruded rods are pultruded and/or extruded in each case at the required position within the framework. The rods are pultruded and/or extruded at the required position within the framework so that after the pultrusion and/or extrusion of the rods, i.e. the production of the rods, the rods no longer have to be moved relative to other rods, which have already been produced or still to be produced. The cost of producing a framework can be substantially reduced, because the rods are already produced in those positions where the rods are arranged at the two-dimensionally or three-dimensional framework. A laborious arrangement of already produced rods at the required positions is thus no longer necessary in an advantageous manner.

In particular after the pultrusion and/or extrusion the pultruded and/or extruded rods are not moved relative to the other rods and/or the matrix of the pultruded and/or extruded rods hardens at the required position within the framework and/or the pultrusion and extrusion is carried out simultaneously and/or continuously.

In a further embodiment, the pultrusion is carried out as a first step for the production of the rods, and as a second step, the extrusion is carried out, so that the in the first step partially produced pultruded rods are post-processed with extrusion and/or each rod is produced, in particular continuously, in a way that the pultrusion unit and/or extrusion unit, in particular continuously, is moved in space in a movement path at the required position within the framework for this rod.

In a supplementary embodiment, the movement path is mainly a straight line and preferably the straight line crosses the two nodes for connecting this rod and/or different frameworks are produced with rods arranged differently to one another in a way that the pultrusion unit and/or extrusion unit is moved in differently positioned movement paths, preferably one after another, and/or the pultrusion unit and/or extrusion unit is moved with a robot and/or after the pultrusion and/or extrusion of a first produced rod and before the pultrusion and/or extrusion of another rod produced later, with a cutting unit the composite material with fibers and matrix is cut, preferably the final end of the first-produced rod has a different position as the beginning end of the later-produced rod. When the final end of the first-produced rod has a different position than a beginning end of the later-produced rod, after the extrusion and/or pultrusion of the first-produced rod the composite material with the fibers and the matrix is cut with the cutting unit, so that the final end of the first-produced rod remains in the space and then the extrusion and/or pultrusion unit is moved to a different position, and the extrusion and/or pultrusion is resumed. The rods each have two ends, and in the beginning a beginning end is produced as an end and then the remaining rod and then a final end as an end.

In one variant, straight rods are produced, in particular all rods are produced as straight rods and/or rods are produced whose length is at least 2, 4, 5, 10 or 20 times larger than the diameter of the rods and/or the cross-sectional shape of the rods is formed during extrusion and/or the length of the rods is formed by the length of the movement path of the pultrusion unit and/or extrusion unit and/or the rods are connected to the nodes without hinges and/or the rods, in particular all the rods, are made without a cavity or without a hollow channel and/or the ends of the rods are connected to the nodes and/or the rods are connected to the nodes with the same composite material as the composite material with which the rods themselves are produced, especially the nodes are produced at least partially, in particular completely, with the same pultrusion unit and/or the same extrusion unit by means of pultrusion and/or extrusion as the rods themselves, preferably a node is formed by one end and/or a fastening extension of a rod. The framework is designed with nodes without hinges, so that it is not an ideal framework, that is to say low bending moments are taken at the nodes or occur after the manufacture of the framework. The framework is thus a construction in which a plurality of rods with two ends, i.e. a beginning end and a final end, with at least one other rod and/or another component, for example a plate, a base and/or a tube, are connected with a node. In the rods, therefore, mainly only tensile and compressive forces occur, as a result of which the framework has a high load-bearing capacity. However, due to the design of the nodes without a friction-free hinge, low bending moments occur in the region of the nodes as well as in the rods, in particular in the vicinity of the nodes.

Expediently, the fibers and preferably the matrix are continuously conveyed first through the pultrusion unit and subsequently through the extrusion unit, and/or hybrid yarns with fibers and matrix are conveyed to the pultrusion unit or the fibers and the matrix are conveyed separately to the pultrusion unit and/or the fibers or hybrid yarns are uncoiled from coils and conveyed to the pultrusion unit and/or the rods, in particular all the rods, are produced so that at least one fiber, preferably a plurality of fibers, is or are arranged on an outer side of the rods, and/or the rods, in particular all the rods, are produced so that at least one fiber, preferably a plurality of fibers, does not have a complete covering with the matrix and/or the rods, in particular all the rods, are produced so that the matrix is arranged between the fibers. In the rods the fibers are firmly bonded together in a material-locking manner by means of the matrix, because the matrix is hardened. The fibers are also arranged on the outer side of the rods, so that the fibers can be seen or grasped on the outer side of the rods. In particular, the fibers are not arranged in an inner region of the rods and the matrix is arranged in an outer envelope. Rather, the fibers and the matrix are distributed over the cross-sectional shape and the matrix is also arranged between the fibers. Preferably, a rod comprises, for example, at least two, three, five or ten fibers.

In a further embodiment, in the pultrusion unit during the pultrusion by means of the matrix the fibers are connected in a material-locking manner together, in particular by heating and/or hardening the matrix and/or the matrix is cooled during conveying from the pultrusion unit to the extrusion unit, so that the fibers are connected to one another in a material-locking manner and/or the fibers and the matrix are conveyed by means of a conveying device, for example with two conveyor wheels, in particular as the conveying device is acting onto the fibers with the matrix during the conveying of the fibers with the matrix from the pultrusion unit to the extrusion unit and/or the fibers and the matrix first are connected to one another in a material-locking manner by means of pultrusion, in particular by heating and/or hardening of the matrix, and then the cross-sectional shape of the rods is formed during extrusion in the extrusion unit and/or the rods are produced with a maximum diameter between 1 mm and 30 mm, in particular between 2 mm and 20 mm.

In a further embodiment, the fibers are heated with the matrix in the extrusion unit and/or in the extrusion unit the cross-sectional shape, preferably circular, ellipsoidal or rectangular, of the rods is formed during extrusion and/or in the pultrusion unit the fibers with the matrix are first heated, during the conveying of the fibers with the matrix from the pultrusion unit to the extrusion unit the fibers cool down and in the extrusion unit the fibers with the matrix are reheated and/or in the pultrusion unit the fibers with the matrix are with a, preferably first, cooling device actively cooled and/or the fibers with the matrix after being conveyed through the extrusion unit are actively cooled with a, preferably second, cooling device, for example a blower. The second cooling device is operated in particular in such a way that this depends on the speed of the extrusion of the fibers with the matrix. The faster the fibers are extruded with the matrix, the more powerful the cooling device is operated and vice versa. The second cooling device is thus required in order to be able to produce the rods straight.

In a further embodiment, the rods are produced with plastic, preferably thermoplastic or thermosetting plastic, or a resin as matrix and/or the rods are produced with fibers as glass fibers, carbon fibers and/or aramid fibers, and/or the rods are made exclusively from matrix and fibers and/or the rods are produced so that the mass fraction or volume fraction of the fibers is at least 30%, 40%, 60% or 80% and/or the rods are produced so that the mass fraction or volume fraction of the matrix is less than 70% %, 60%, 40% or 20%, and/or the rods are made so that the rods are formed exclusively from the fibers and the matrix.

In a supplementary embodiment, the rods, in particular all the rods, are produced so that the length of the fibers, in particular of all the fibers, corresponds in each rod mainly to the length of the rod. Mainly means that the length of the rods corresponds to a deviation of less than 30%, 20%, 10% or 5% to the length of the fibers in the respective rods.

In a supplementary variant, the rods of the framework are connected to at least one component, in particular at least one plate, in a form-fitting manner and/or material-locking manner, preferably by a fastening extension of the rods being produced at least partially within a cutout of the component, in particular analogously to the production of the rods and/or the rods of the framework are connected to at least one component, in particular at least one plate, in a form-fitting manner and/or material-locking manner, preferably by heating the component partially, so that the partially heated material of the component is in a material-locking manner connected to the heated matrix of the rods.

In a further embodiment, the rods of the framework are connected to a plurality of plates, for example two or three plates, and preferably the plates are aligned essentially parallel to one another, and preferably two plates are connected to each other by means of a framework between the two plates.

In an additional embodiment, two rods are connected to each other by a node by moving the pultrusion unit and/or extrusion unit in a first straight movement path, and in the region of the node a change of the movement path to a second straight movement path is performed, so that the node together with the two rods are produced with the pultrusion unit and/or extrusion unit, in particular in one part, and/or one end of an already produced first rod is connected to a still to be produced second rod at a node by the way that the pultrusion unit and/or extrusion unit being moved to the end of the already existing first rod and the end of the already produced first rod is connected to the second rod still to be produced by heating the end of the already produced first rod, in particular the matrix of the already produced first rod at the end, in particular with a heating device in the extrusion unit, so that during the production of the second rod the matrix in the first rod is connected to the matrix in the second rod in a material-locking manner and/or one end of an already produced first rod is connected to a still to be produced second rod at a node by the way that the pultrusion unit and/or extrusion unit being moved to the end of the already existing first rod and the end of the already produced first rod is connected to the second rod still to be produced by producing a fastening extension at the end of the second rod and the fastening extension is in a material-locking manner connected to the end of the first rod, in particular as the fastening extension being produced by means of a corresponding movement path of the pultrusion unit and/or extrusion unit at the end of the first rod by wrapping and/or winding.

A two-dimensional or three-dimensional framework or/respectively truss according to the invention with rods connected to nodes with at least one other rod and/or another component, of a composite material with fibers and a matrix comprising a plurality of straight rods of a composite material with fibers and a matrix, nodes with which the rods are connected to at least one other rod and/or another component, whereby the framework is being produced with a method described in this patent application and/or the length of the fibers, in particular of all the fibers, in each rod is mainly identical to the length of this rod.

In an advantageous embodiment, the rods of the framework are connected, in particular in a material-locking manner, to a plurality of plates, for example two or three plates and preferably the plates are aligned substantially parallel to one another, and preferably two plates are connected to each other by means of a framework between the two plates and/or the nodes, in particular all the nodes, are formed without hinges and/or a node, in particular all nodes, are formed from the same material as the rods and/or the plates are at least partially made of plastic, in particular thermoplastic, and/or the rods, preferably all the rods, are formed with plastic, preferably a thermoplastic, as the matrix and/or the rods, preferably all the rods, are formed with fibers as glass fibers, carbon fibers and/or aramid fibers and/or the rods are exclusively formed with fibers and matrix and/or the mass fraction or volume fraction of the fibers in the rods, preferably all the rods, is at least 30%, 40%, 60% or 80%, and/or the mass fraction or volume fraction of the matrix in the rods, preferably all the rods, is less than 70%, 60%, 40% or 20% and/or the rods, preferably all the rods, are formed exclusively from the fibers and the matrix, and/or the rods, in particular all the rods, are of a straight design and/or the length of the rods is at least 2, 4, 5, 10 or 20 times greater than the diameter of the rods and/or the ends of the rods are connected with the nodes and/or the rods, in particular all the rods, are formed without cavity, and/or the rods, preferably all the rods, are formed such that at least one fiber, respectively preferably a plurality of fibers, is or are arranged on the outer side so that the at least one fiber, preferably the fibers, can be seen or grasped on the outer side of the rods and/or at least one fiber, preferably a plurality of fibers, in the rods, in particular all the rods, do not have a complete covering with the matrix and/or the fibers are connected in a material-locking manner to each other with the matrix between the fibers and/or the nodes have an arbitrary shape or geometry and/or the nodes have a shape or geometry deviating from hinges.

The invention further comprises a computer program having program code means stored on a computer readable medium for carrying out a method described in this patent application when the computer program is performed on a computer or a corresponding computing unit.

The invention also provides a computer program product comprising program code means stored on a computer readable medium for carrying out a method described in this patent application when the computer program is performed on a computer or a corresponding computing unit.

Embodiments of the invention are described in more detail below with reference to the accompanying drawings.

Figure 2:
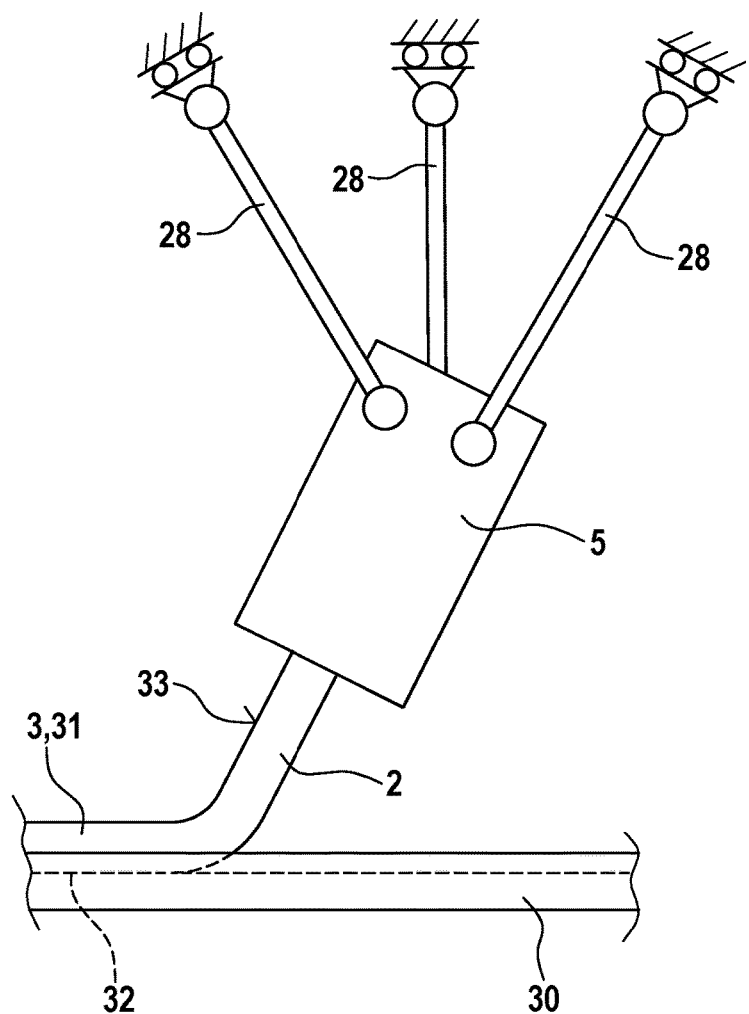
Figure 3:
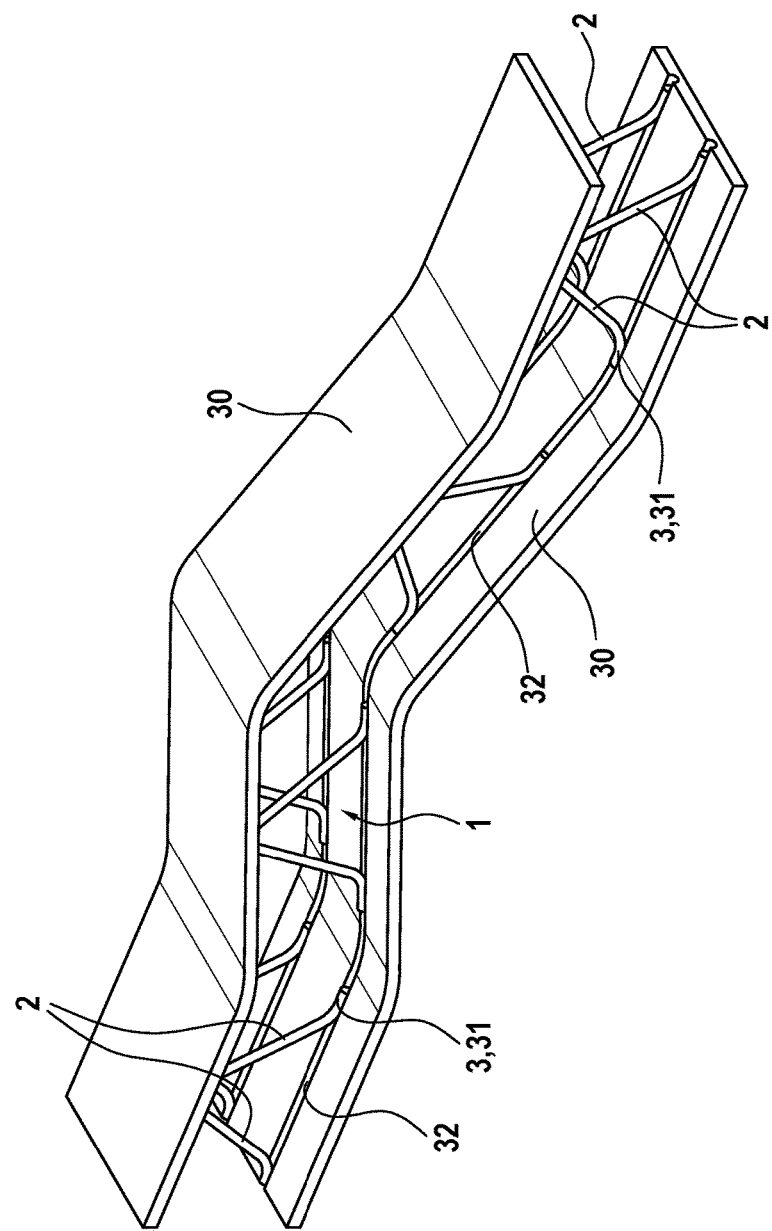
Figure 4:
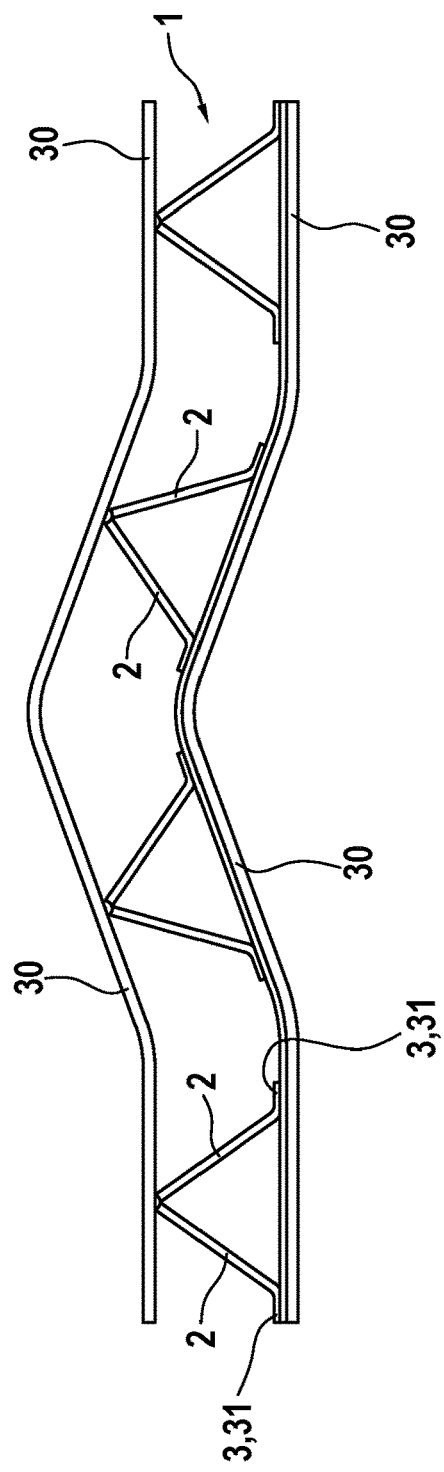
Figure 5:
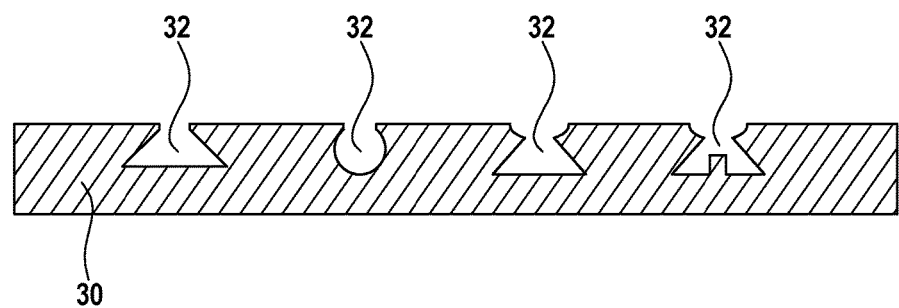
Figure 6:
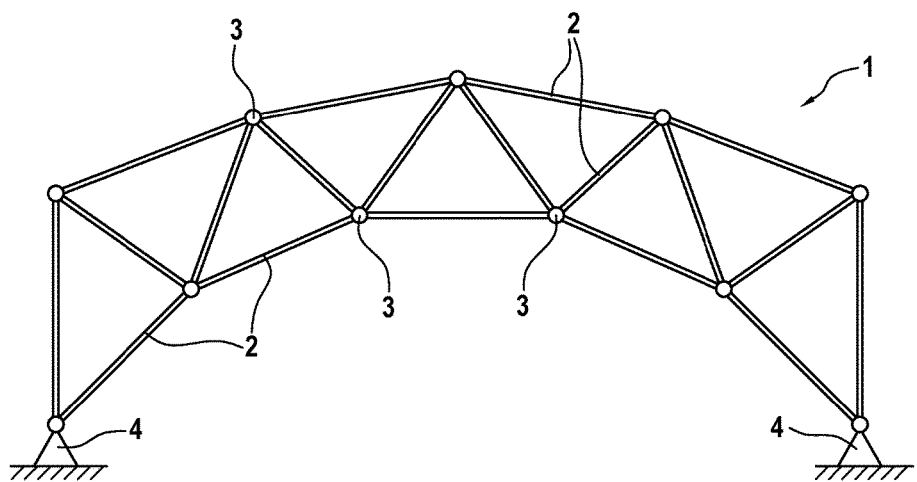

It shows:

FIG. 1 shows a simplified longitudinal section of a process unit with a pultrusion unit and extrusion unit for carrying out the method, FIG. 2 shows a side view of the process unit during the execution of the method, FIG. 3 is a perspective view of a framework with two plates, FIG. 4 is a side view of the framework and the two plates according to FIG. 3, FIG. 5 shows different cross-sectional shapes for plates shown in FIGS. 3 and 4 and FIG. 6 shows an example of a two-dimensional framework.

A framework 1 or/respectively a truss 1 shown in FIG. 6 consists of a plurality of straight rods 2 or/respectively members as rods 2 made of a composite material, namely fibers as glass fibers and a matrix as a thermoplastic. The straight rods 2 are thereby connected to one another at nodes 3. The nodes 3 are in each case connected to at least two ends of rods 2. The nodes 3 are not formed as joints or hinges, but as nodes 3 of the same material as the rods 2. The nodes 3 are thus not hinges, in particular no friction-free hinges, so that the nodes 3 and the rods 2, especially in the proximity of the nodes 3, low bending moments occur when the framework 1 is loaded. However, the stress on the rods 2 is essentially due to pressure or tensile forces. The forces to be carried by the framework 1 are introduced into the framework 1 (not shown) exclusively at the nodes 3. The framework 1 is mounted by means of two bearings 4.

FIGS. 1 and 2 shows a process unit 5 for the production of the framework 1, that is to say for the production of the rods 2 and the nodes 3. The process unit 5 comprises a pultrusion unit 6 and an extrusion unit 7. A pultrusion channel 9 is formed in the pultrusion unit 6 and in a right-to-left direction as shown in FIG. 1 the pultrusion channel 9 first has a conical tapered section and then a section with a constant diameter. On the pultrusion channel 9 in the section with the constant diameter in a direction as shown in FIG. 1 from right to left as well as in a conveying direction of hybrid yarns 21 or of the rod 2 to be produced a first heating device 8 is first arranged and then a first cooling device 10. A cooling channel 11 is formed on the first cooling device 10, through which a cooling fluid is passed through for cooling the partially produced rod 2. The extrusion unit 7 comprises an extrusion channel 15 and the extrusion channel 15 comprises a first conical tapered section and a second portion of a constant diameter. A second heating device 16 is formed on the second section of the extrusion passage 15 having the constant diameter. The first and second heating devices 8, 16 are preferably configured as an electrical resistance heater. In the conveying direction of the rod 2 to be produced through the extrusion channel 15, first the conical tapering section of the extrusion channel 15 and, subsequently, the portion of the extrusion channel 15 with the constant diameter are formed. A conveying device 12 is formed between the pultrusion unit 6 and the extrusion unit 7. The conveying device 12 comprises a first conveying wheel 13 and a second conveying wheel 14, which are driven by an electric motor (not shown). The partially produced rod 2 is arranged between the two conveyor wheels 13, 14, so that the partially produced rod 2 is pulled out of the pultrusion unit 6 with the conveying device 12 and is pushed into the extrusion unit 7 with the conveying device 12.

The pultrusion unit 6 and the extrusion unit 7 are connected to one another by means of a connecting part 20, for example a housing which is only partially shown in FIG. 1. Furthermore, a feeding part 23 with three guide bores 24 is fastened to the connecting part 20. A hybrid yarn 21 is rolled up in each case on three coils 22. The hybrid yarn 21 consists of a fiber as a glass fiber and also has the matrix of a thermoplastic material. The matrix as the thermoplastic is arranged in the hybrid yarn 21 as a fibrous matrix or as a matrix fiber. The hybrid yarn 21 is bendable and can thus be unrolled from the coil 22. A second cooling device 17 is also attached to the extrusion unit 7. The second cooling device 17 comprises a blower 18 and a cooling tube 19. Ambient air is directed through the cooling tube 19 by means of the blower 18, specifically to the region of the rod 2 immediately after leaving the extrusion unit 7. A cutting unit 25 serves to cut the rod 2, which was extruded at the extrusion unit 7, as far as necessary and as a consequence to be able to produce one end as a free end of the rod 2.

During the production of the rods 2 from the composite material with the fibers and the matrix, the composite material is first conveyed through the pultrusion unit 6 and subsequently through the extrusion unit 7 by means of the conveying device 12, as shown in FIG. 1, whereby because of the length of the rods 2 and the distance between the pultrusion unit 6 and the extrusion unit 7 both processes are done at the same time. Thus, during the conveying of the composite material, the hybrid yarn 21 is unrolled from the three coils 22 and inserted into the conical tapered section of the pultrusion channel 9. At the second section of the pultrusion channel 9 with the constant-diameter, the three hybrid yarns 21 are heated with the first heating device 8, so that the thermoplastic material of the matrix melts at the hybrid yarns 21 and thereby the glass fibers in the three hybrid yarns 21 are connected together in a material-locking manner by the pultrusion process. Subsequently, the composite material with the fibers and the matrix is conveyed to the section of the pultrusion channel 9 with the first cooling device 10, thereby cooling the composite material with the glass fibers and the thermoplastic and as a consequence is hardening. After the composite material with the fibers and the matrix has emerged, the composite material with the matrix of the already partially produced rod 2 is conveyed into the extrusion unit 7 by the conveying device 12. Because of the cooling of the composite material with the fibers in the first cooling device 10, the composite material with the fibers can be conveyed by the conveying device 12. In the extrusion unit 7 the composite material with the fibers and the matrix at the section of the extrusion channel 15 with the constant diameter is again slightly heated by the second heating device 16 in such a way that the final shaping of the cross-sectional shape of the rods 2 to be produced is formed in the end part in the conveying direction of the extrusion channel 15. The left end of the extrusion channel 15 in FIG. 1 has a circular cross-sectional shape, so that rods 2 with a circular cross-section are thereby produced by means of the process unit 5. After the rods 2 have been emerged from the extrusion channel 15 of the extrusion unit 7, ambient air is passed by the blower 18 through the cooling tube 19 as cooling air to the rod 2, so that a faster cooling of the rods 2 can be achieved in order to ensure a sufficiently rapid production of the rods 2 in a straight longitudinal configuration.

The rods 2 produced by the method are straight. The rods 2 are produced by the process unit 5 at the required positions within the framework 1 in the final position, so that the process unit 5 is moved on a movement path 26 as a straight line 27 by means of motion arms 28 of a robot greatly simplified in FIG. 2. The movement path 26 as the straight line 27 corresponds with to the longitudinal axis of the rods 2 produced by the process unit 5. After the production of the rods 2, no relative movement of the produced rods 2 to other rods 2 already produced or still to be produced is necessary, because the rods 2 are produced with the process unit 5 at the required position within the framework 1. As a result, the costs for the production of the framework 1 with the process unit 5 can be substantially reduced. In FIG. 2, the coils 22 and the hybrid yarns 21 are not shown.

FIGS. 3 and 4 shows a further exemplary embodiment for a framework 1. On the framework 1 of rods 2, two plates 30 as components 29 are connected to the rods 2. On one side of the lower plate 30, two elongated cutouts 32 are formed. FIG. 5 shows four examples of the cross-sectional shape of the cutouts 32. The cutouts 32 have an undercut, so that after the composite material with the fibers and the matrix has cooled and hardened, a form-fitting connection of a fastening extension 31 of the rods 2 to the plates 30 is formed inside the cutout 32. By the production of the framework 1 in FIGS. 3 and 4, the process unit 5 is initially moved in the space, so that the fastening extension 31 is introduced by the process unit 5 to a partial section of the cutout 32, that is to say the fastening extension 31 is partially arranged in the cutout 32 and thus the process unit 5 is moved slightly above the cutout 32. Subsequently, the process unit 5 is moved along the longitudinal axis of the rods 2 by means of a straight movement path 26. The lower plate 30 shown in FIGS. 3 and 4 thus has the two cutouts 32 by means of which the fastening extensions 31 of the rods 2 are fastened to the lower plate 30. The fastening extensions 31 thus form a node 3 for connecting the rods 2 to the lower plate 30. The lower plate 30 is made of metal. The upper plate 30 is made of a thermoplastic material. In order to connect the rods 3 to the upper plate 30, the process unit 5, in particular the extrusion unit 7, has an additional heating device by means of which one side of the plates 30 can be locally heated and the thermoplastic of the upper plate 30 can be locally melted. Subsequently, the process unit 5 is moved to this locally heated region of the plate 30, so that the extruded material of the rods 2 respectively nodes 3, that is to say the matrix of the rods 2 respectively the nodes 3, is connected in a material-locking manner respectively is materially bonded to the locally heated region at the plate 30. The additional heating device can also be formed by the second heating device 16.

In order to produce a framework 1 with the rods 2, the process unit 5 is thus moved along the longitudinal axis of the rod 2 to be produced as a straight movement path 26 by a robot (not shown). By the production of the rods 2, the beginning end of the rods 2 is thus first produced starting with the beginning end of the rods 2, then the remaining part of the rod 2 is produced, and finally the final end of the rods 2 is produced. If the final end of a rod 2 already produced is connected at a node 3 to the beginning end of a rod 2 which has to be produced, the process unit 5 can be simply moved by the robot in a different path 26 as a straight line during the pultrusion and extrusion corresponding to the longitudinal axis of the rod 2, which is has to be produced, so that the nodes 3 are produced continuously and in one piece as the final end of a first-produced rod 2 and as the beginning end of a later-produced rod 2 in a particularly simple manner.

In addition it is also possible by means of the method, to connect to an already produced final end of a rod 2 or to an already produced node 3, to which two ends of rods 2 have already been connected, a further rod 2 thereto. For this purpose, the process unit 5 is moved to the end of the rod 2 or to the node 3 and the process unit 5 is moved in such a way that the material as the composite material extruded from the extrusion channel 15 is wrapped around the end of the rod 2 or around the node 3 and preferably the second cooling device 17 is not operated, so that after the composite material has been conveyed out of the extrusion channel 15, the composite material is still bendable and shapeable to the end of the rod 2 or to the node 3. In contrast thereto, the connection of the rod 2 still to be produced 2 with the end of the rod 2 or the node 3 can also be carried out by heating the end of the already produced rod 2 or the node 3 with the additional heating device and thereby melting the matrix of the thermoplastic material so that the matrix from the extrusion channel 15 for the rod 2 which is still to be produced is connected to the end of the already produced rod 2 or the node 3 by means of the thermoplastic, which is melted by the additional heating device.

In a further exemplary embodiment of the process unit 5 (not shown), the fibers, for example glass fibers, aramid fibers or carbon fibers, are rolled on coils 22, and the matrix as the thermoplastic material is separated in a container with a container heating in a heated state and is conveyed to the pultrusion unit 6 by means of a matrix conveying device (not shown). The pultrusion unit 6 and the extrusion unit 7 can also be designed as a single component 29 in a way that for example after the pultrusion the extrusion is immediate operated, that is to say the final shaping of an outer side 33 of the rod 2 is operated without an arrangement of the conveyor 12 between the extrusion unit 7 and the pultrusion unit 6.

In another exemplary embodiment, which is not shown, a thermosetting plastic is used instead of thermoplastic as the matrix. The thermosetting plastic is separately stored in a container and fed by means of a matrix conveying device to the extrusion unit 7 and/or the pultrusion unit 6. The thermosetting plastic is hardened by means of an irradiation or an addition of chemical additives.

Overall, substantial advantages are associated with the method according to the invention for producing the inventive framework 1. The rods 2 and the nodes 3 of the framework 1 are made of a composite material with fibers and a matrix. During the production, the process unit 5 is moved along a longitudinal axis of the rod 2 to be produced as a straight movement path 26, so that the rods 2 made of the composite material can already be produced within the framework 2 in the necessary positions and thus the costs for the production of the framework 1 are substantially reduced. When the hybrid yarn 21 is used, the proportion of the matrix and the fibers in the rods 2 is constant. By the use of a different number of hybrid yarns 21 respectively fibers for the production of a respective rod 2, it is also possible to produce rods 2 with a different diameter. Furthermore, the rods 2 can also be produced in a different cross-sectional shape. For this purpose, the end of the extrusion channel 15 has an interchangeable shaping part, which is not shown in FIG. 1, so that rods 2 in addition to the described circular shape can also be produced simply as ellipsoidal rods 2 or rectangular rods 2 in the cross-sectional shape.

The invention claimed is:

1. Method for producing a two-dimensional or three-dimensional framework with rods of a composite material with fibers and a matrix, which are connected with nodes to at least one other rod comprising the steps of:
producing the rods out of the composite material,
connecting the rods with at least one other rod and at the nodes wherein the rods are being produced with pultrusion and/or extrusion and a pultrusion unit and/or an extrusion unit is moved in space such that after the pultrusion and/or extrusion any pultruded and/or extruded rods are pultruded and/or extruded in each case at a required position within the framework to produce a truss.

2. Method according to claim 1, wherein the pultruded and/or extruded rods after the pultrusion and/or extrusion are not moved relative to the other rods.

3. Method according to claim 1, wherein the matrix of the pultruded and/or extruded rods hardens at the required position within the framework.

4. Method according to claim 1, wherein the pultrusion and extrusion is carried out simultaneously and/or continuously.

5. Method according to claim 1, wherein for a production of the rods the pultrusion is carried out as a first step and wherein a process comprises a second step, wherein the extrusion is carried out, so that the in a first step partially produced pultruded rods are post-processed with extrusion.

6. Method according to claim 1, wherein each rod is produced, in particular continuously, in a way that the pultrusion unit and/or extrusion unit, in particular continuously, is moved in space in a movement path at the required position within the framework for this rod.

7. Method according to claim 6, wherein the movement path is mainly a straight line and preferably the straight line crosses two nodes for connecting this rod.

8. Method according to claim 6, wherein the pultrusion unit and/or extrusion unit is moved with a robot.

9. Method according to claim 1, wherein the rods are connected to the nodes without hinges.

10. Method according to claim 1, wherein the rods are connected to the nodes with the same composite material as the composite material with which the rods themselves are produced, especially the nodes are produced at least partially, in particular completely, with the same pultrusion unit and/or the same extrusion unit by means of pultrusion and/or extrusion as the rods themselves, preferably said node is formed by one end of the rod.

11. Method according to claim 5, wherein the matrix is cooled during conveying from the pultrusion unit to an extrusion unit, so that the fibers are connected to one another in a material-locking manner.

12. Method according to claim 11, wherein in the pultrusion unit the fibers with the matrix are first heated, during the conveying of the fibers with the matrix from the pultrusion unit to the extrusion unit the fibers cool down and in the extrusion unit the fibers with the matrix are reheated.

13. Method according to claim 1, wherein the rods are made so that the rods are formed exclusively from the fibers and the matrix.

14. Method according to claim 1, wherein the rods, in particular all the rods are produced so that a length of the fibers, in particular of all the fibers, corresponds in each rod mainly to a length of the rod.

15. Method according to claim 1, wherein the rods of the framework are connected to at least one component in particular at least one plate in a form-fitting manner preferably by a fastening extension of the rods being produced at least partially within a cutout of the component, in particular analogously to a production of the rods.

16. Method according to claim 1, wherein the rods of the framework are connected to at least one component, in particular at least one plate in a form-fitting manner preferably by heating the component partially, so that the partially heated material of the component is in a material-locking manner connected to the heated matrix of the rods.

17. Method according to claim 11, wherein two rods are connected to each other by said node by moving the pultrusion unit and/or extrusion unit in a first straight movement path, and in a region of the node a change of the movement path to a second straight movement path is performed, so that the node together with the two rods are produced with the pultrusion unit and/or extrusion unit, in particular in one part.

18. Method according to claim 1, wherein the rods are connected to the nodes with the same composite material as the composite material with which the rods themselves are produced, especially the nodes are produced at least partially, in particular completely, with the same pultrusion unit and the same extrusion unit by means of pultrusion and extrusion as the rods themselves, preferably said node is formed by a fastening extension of the rod.

19. Method according to claim 1, wherein the rods of the framework are connected to at least one component in particular at least one plate in a material locking manner preferably by a fastening extension of the rods being produced at least partially within a cutout of the component, in particular analogously to a production of the rods.

20. Method according to claim 1, wherein the rods of the framework are connected to at least one component, in particular at least one plate in a material locking manner preferably by heating the component partially, so that the partially heated material of the component is in a material-locking manner connected to the heated matrix of the rods.

* * * * *